May 13, 1924.
E. R. EVANS
FRONT WHEEL BRAKE
Filed Dec. 16, 1922    2 Sheets-Sheet 2
1,493,742
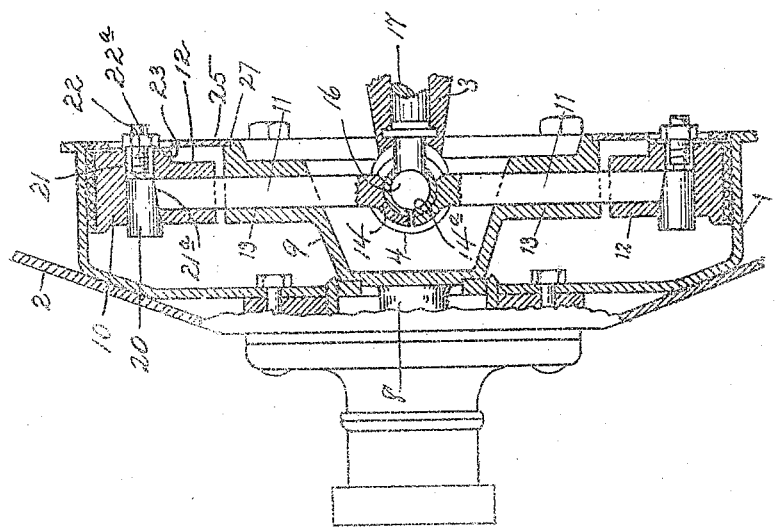
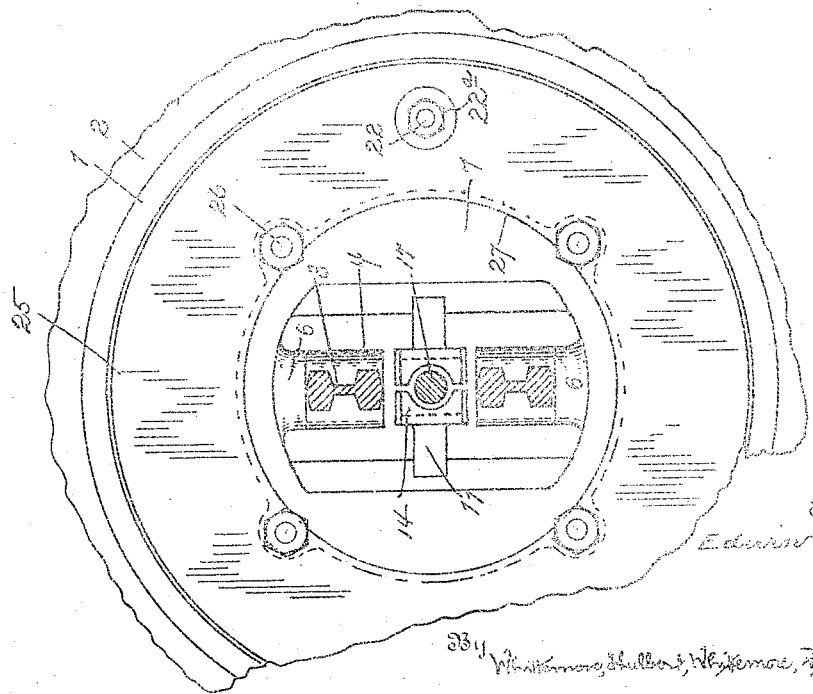

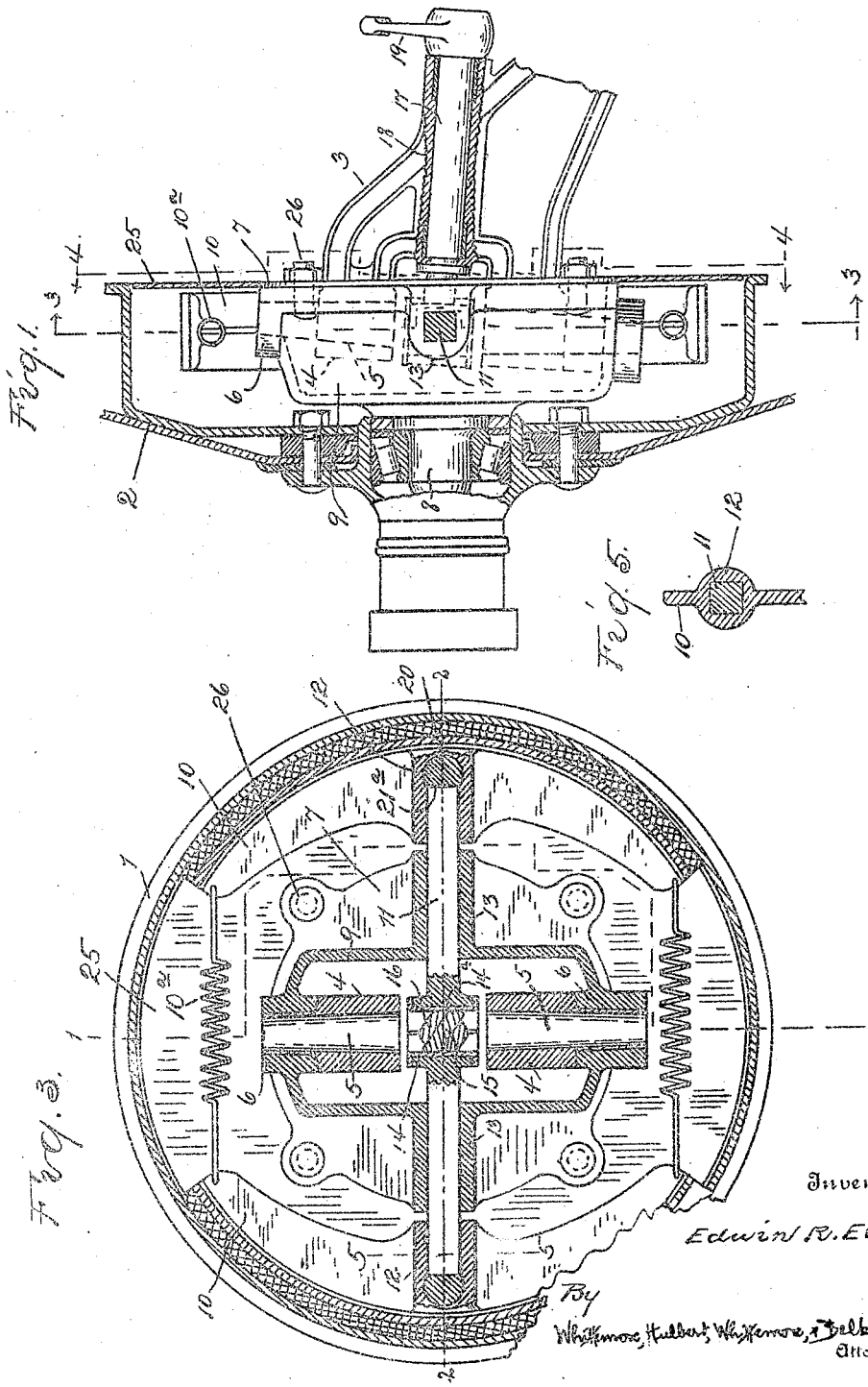

Patented May 13, 1924.

1,493,742

UNITED STATES PATENT OFFICE.

EDWIN R. EVANS, OF DETROIT, MICHIGAN.

FRONT-WHEEL BRAKE.

Application filed December 16, 1922. Serial No. 607,342.

*To all whom it may concern:*

Be it known that I, EDWIN R. EVANS, a citizen of the United States of America, residing at Detroit, in the county of Wayne, and State of Michigan, have invented certain new and useful Improvements in Front-Wheel Brakes, of which the following is a specification, reference being had therein to the accompanying drawings.

This invention relates to vehicle brakes and relates more particularly to front wheel brakes for motor vehicles.

The invention consists in the structural features and arrangement of parts hereinafter described.

In the drawings:—

Figure 1 is a view in elevation of a front axle extremity showing in vertical section the corresponding front wheel and its brake mechanism, the plane of section being indicated at 1—1 in Figure 3;

Figure 2 is a similar view in horizontal section, taken on line 2—2 of Figure 3;

Figure 3 is a section transverse to the axis of rotation of the wheel through the brake mechanism, the plane of section being illustrated at 3—3 of Figure 1;

Figure 4 is a cross section on line 4—4 of Figure 1;

Figure 5 is a sectional detail on line 5—5 of Figure 3 showing the mounting of one of the thrust rods through which the braking pressure is applied.

In these views the reference character 1 designates a brake drum and 2 the body of a vehicle wheel carrying said drum. Said body, as illustrated, is of a disk type but the invention is equally applicable to wheels of other well known types. Said wheel is mounted upon an axle 3 which is terminally forked to provide vertically spaced bearings 4 wherein pins 5 are respectively mounted fast to establish a swivel steering axis for the wheel 2. Said pins project upwardly and downwardly from the upper and lower bearings respectively to support rotative bearings 6 which are integrally formed in diametrically opposed relation upon a circular support 7 for a spindle 8 upon which the wheel 2 is journaled. Said mounting has a dished central portion 9 which affords clearance for the axle bearings 4. 10 designates a pair of brake shoes interiorly engageable with the drum 1 in a horizontally opposed relation, said shoes being connected at their upper and lower extremities by coiled springs $10^a$ normally holding said shoes slightly spaced from said drum. Said shoes are respectively supported by a pair of diametrically aligned substantially horizontal rods 11 which, as will presently appear, function also to transmit the braking thrust to said shoes. Each thrust rod 11 is preferably of square cross section and is slidably engaged with openings of corresponding cross section formed in aligned radial bearings 12 and 13 respectively centrally integral with each brake shoe and with the spindle support 7, the bearings 13 on said support being located at each side of the dished portion 9 thereof, as is best seen in Figure 3. Within said dished portion and between the spaced axle bearings 4, the thrust rods 11 are formed with complementary semi-cylindrical heads 14, the axis of which coincides with the swivel axis established by said bearing. It is preferred to line said heads with replaceable semi-cylindrical bushings, as indicated at $14^a$. 15 designates a cam occupying the cylindrical pocket jointly formed by the complementary heads 14, and elongated between the opposed end faces of the brake shoes in an oblique relation to said faces. Said cam is freely longitudinally slidable in a head 16 arranged within said cylindrical pocket and formed terminally and preferably integrally upon a rock shaft 17 which extends inwardly from the wheel in the plane of the axis of the bearings 6 and is journaled in a bearing 18 formed integral with the axle 3 between said bearing 6, the inner end of said rock shaft being provided with an actuating arm 19. Said cam 15 is restrained from rotation within the head 16, this being accomplished preferably by forming the cam and the opening of the head receiving said cam of square (or other polygonal) cross section.

Considering the operation of the construction as so far described, when the shaft 17 is rocked by means of the arm 19, the angle of obliquity between said cam and the thrust rods 11 is decreased, whereby said rods are forced apart. The brake shoes 10, since they are mounted upon said thrust rods, are also forced apart by rocking of the cam 15 and are thereby frictionally engaged with opposed portions of the brake drum 1. When the force setting the brakes is released the springs 10ª return the brake shoes to their normal slightly spaced relation to the brake drum, the accompanying shifting of the thrust rods 11 toward each other acting upon the cam 15 to return the rock shaft 17 to the normal position disclosed in Figure 3.

The thrust of the rods 11 is applied to the brake shoes through elements which are adjustable in said shoes transversely to said rods for the purpose of taking up wear of the brake shoes. Thus 20 indicates a wedge mounted within a bore 21 formed in the bearing 12 of each brake shoe, said wedge being horizontally adjustable in said bore transversely to the corresponding thrust rod. Each wedge 20 has a flat surface 21ª which is inclined horizontally to the corresponding thrust rod, the end face of the latter, which engages said wedge, being correspondingly inclined. Each wedge 20 is formed with a screw threaded shank 22 projecting from the small end of the wedge and preferably integral with said wedge and a nut 22ª upon said shank bears upon a washer 25 seating laterally upon the bearing 12 as a means for adjusting the wedge. Thus by turning said nut the wedge may be adjusted toward the nut to force the brake shoe into closer proximity to the interior face of the drum 1. 25 is a plate forming a closure for the inner side of the brake drum, said plate being secured to the spindle support 7 by bolts 26 and being formed with a central opening 27 to accommodate the forked axle extremity and the rock shaft 17.

It is to be noted that the bearing faces of the cam 15 are spherically rounded so as to permit said cam to rock in a vertical plane and still exert an axial thrust upon the thrust rod heads 14 and to permit the unitary turning of the wheel and spindle mounting 7 upon the vertical axis established by the bearings 6 without interference with or by said cam. The advantage of the sliding mounting of the cam in the head 16 lies in the resulting equalization of the thrust transmitted through said cam to the respective rods 11, said cam being self adjusting along its longitudinal axis to effect such equalization. This feature, however, is more particularly the subject-matter of applicant's co-pending application, Serial Number 607,541.

What I claim as my invention is:—

1. In a brake, the combination with a brake drum, and a brake shoe interiorly engageable with said drum, of an actuating element for said shoe within said drum, and an element carried by the brake shoe and transmitting the actuating force thereto, adjustable in said shoe to take up wear.

2. A brake comprising a brake drum, and a brake shoe interiorly engageable with said drum, an actuating element for said shoe within said drum, and an element carried by the shoe and transmitting the actuating effort thereto adjustable in a direction parallel to the axis of the drum to take up wear.

3. A brake comprising a brake drum, a brake shoe interiorly engageable with said drum, a thrust rod radially mounted within said drum for actuating said shoe, and a wedge member transmitting the thrust of said rod to the shoe adjustable transversely of the rod to take up wear.

4. In a brake, the combination with an axle, and a vehicle wheel, of a mounting for said wheel swiveled upon said axle, the swivel axis being substantially vertical, a brake drum carried by said wheel, a brake shoe interiorly engageable with said drum, a thrust rod radially disposed within the drum and slidable upon said mounting, transversely of said swivel axis, and actuating means for said rod disposed centrally within said drum.

5. In a brake, the combination with a brake drum, of a pair of brake shoes engageable with horizontally opposed portions of said drum, a pair of diametrically aligned substantially horizontal thrust rods for respectively actuating said shoes, and a common actuating element for said rods disposed substantially at the center of said drum.

6. In a brake, the combination with a brake drum, and a brake shoe interiorly engageable with said drum, of a thrust rod arranged radially of said drum, and engaging said brake shoe substantially midway between the ends thereof, said rod forming a support for said shoe, and means restraining said rod from rotation.

7. In a brake, the combination with a brake drum, a pair of brake shoes interiorly engageable with said drum, of a common actuating element for said shoes within said drum, and an element carried by each brake shoe and transmitting the actuating force thereto adjustable in said shoe to take up wear.

8. In a brake, the combination with a brake drum, and a brake shoe engageable with said drum, of a mounting for said shoe, and a member carried by the shoe and adjustable therein relative to said mounting to take up wear.

9. In a brake, the combination with a brake drum, and a brake shoe interiorly engageable with said drum, of a thrust rod arranged radially of said drum and directly engaging the brake shoe substantially midway between the ends thereof, and a member transmitting the thrust of said rod to said shoe adjustable in the shoe transversely of the rod to take up wear of the shoe.

10. In a vehicle wheel brake, the combination with a brake drum carried by a vehicle wheel, and a brake shoe interiorly engageable with said drum, of a spindle journalling said wheel, a member having transverse bearings, a pin establishing a swivel steering axis for the wheel engaging one of said bearings, a thrust rod for actuating the brake shoe engaging the other bearing, and means disposed substantially coaxial with the drum for actuating said thrust rod.

In testimony whereof I affix my signature.

EDWIN R. EVANS.